(12) United States Patent
El-Ibiary

(10) Patent No.: US 6,331,823 B1
(45) Date of Patent: *Dec. 18, 2001

(54) MONITORING SYSTEM FOR BEARINGS

(75) Inventor: Yehia El-Ibiary, Simpsonville, SC (US)

(73) Assignee: Reliance Electric Technologies, LLC, Mayfield Heights, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/554,182

(22) Filed: Nov. 6, 1995

(51) Int. Cl.[7] .................................................. G08B 21/00
(52) U.S. Cl. .............................. 340/870.16; 340/870.17; 340/682; 384/446; 455/67.1; 455/517; 455/507
(58) Field of Search ..................... 340/870.16, 870.15, 340/870.17, 682, 870.02, 683, 539; 455/517, 67.1, 507; 384/440, 448

(56) References Cited

U.S. PATENT DOCUMENTS

| 4,237,454 | 12/1980 | Meyer . | |
|---|---|---|---|
| 5,433,525 | 7/1995 | El-Ibiary . | |
| 5,439,296 | 8/1995 | El-Ibiary . | |
| 5,493,722 | * 2/1996 | Gunn | 455/54.1 |
| 5,509,310 | 4/1996 | El-Ibiary . | |
| 6,007,250 | * 12/1999 | Brauer et al. | 384/448 |

OTHER PUBLICATIONS

Patent Abstracts of Japan, vol. 14, No. 94 (P–1010), Feb. 21, 1990 (discussing JP 13 001131, published Dec. 5, 1989).
Patent Abstracts of Japan, vol. 14, No. 267 (P–1058), Jun. 8, 1990 (discussing JP 20 073499, published Mar. 13, 1990).
U.S. application No. 08/412,521, El–Ibiary et al, filed Mar. 29, 1995.
D. Herrman, "Gleitlageruberwachung–durch einfache Messung von Thermospannungen," *Technisches Messen*, vol. 57, No. 1, pp. 18–22, Jan. 1990 (translated).

\* cited by examiner

*Primary Examiner*—Michael Horabik
*Assistant Examiner*—Albert K. Wong
(74) *Attorney, Agent, or Firm*—Patrick S. Yoder; Alexander M. Gerasimow; William R. Walbrun

(57) ABSTRACT

A system for monitoring the operational status of a plurality of mechanical components, such as various bearings, speed reducers and the like. Each of the mechanical devices includes a respective local transmitter in electrical communication with various local sensors. Among the sensors which may be utilized are a temperature sensor and a shaft speed sensor, as well and an accelerometer for detecting vibration. The local transmitter receives information from the sensors and provides status information in a predetermined output format, such as a serial digital format. Unique electronic identifiers are assigned to respective of the local transmitters to facilitate selective communication with a central monitoring processor. As a result, the status information will be supplied to the central monitoring processor at predetermined times. Preferably, electrical communication between the local transmitters and the central monitoring processor is effected utilizing a bus line structure including a main trunk and a plurality of branch lines, wherein the respective local transmitters are connected to the branch lines.

24 Claims, 2 Drawing Sheets

MONITORING SYSTEM FOR BEARINGS

BACKGROUND OF THE INVENTION

The present invention relates to a system for monitoring status information regarding the operation of bearings, speed reducers or the like.

The various types of machinery generally found in an industrial setting will often utilize many bearings, speed reducers or other such mechanical components. For example, a single conveyor will frequently be equipped with multiple pillow block or flange bearings to support its various rotatable shafts. Speed reducers or other gear boxes may be utilized to transmit mechanical power to the machinery from a suitable prime mover.

The status of these mechanical components is often monitored during operation to determine when some form of corrective action should be taken. For example, the temperature of a bearing can be monitored to lessen the occurrence of overheating. It is also frequently desirable to monitor the rotational speed of the shaft to which the bearing is attached, as well as the extent to which the bearing housing is experiencing undesirable vibration. To facilitate such monitoring, each mechanical component may be equipped with a plurality of sensors.

The signal information provided by the various sensors of many mechanical components may be processed at a central monitoring controller. In the past, however, dedicated transmission lines have typically been provided for each of these sensors. As a result, several transmission lines would generally extend between each of the mechanical components and the central monitoring facility.

Due to the number of mechanical components in a typical industrial facility, the number of transmission lines carrying signal information to the central monitoring controller can become quite large. Thus, it will be appreciated that this type of arrangement will often be complex and cumbersome.

SUMMARY OF THE INVENTION

The present invention recognizes and addresses the foregoing disadvantages, and others, of prior art constructions and methods. Accordingly, it is an object of the present invention to provide an improved system for monitoring a plurality of mechanical components.

It is a more particular object of the present invention to provide a mechanical component monitoring system which substantially reduces the wiring required in prior art arrangements.

It is a more particular object of the present invention to provide a mechanical component monitoring system which facilitates easy connection or disconnection of individual mechanical components from a central monitoring location.

It is also an object of the present invention to provide an improved bearing apparatus for facilitating rotation of a shaft having a plurality of sensor devices associated therewith.

It is also an object of the present invention to provide an improved method of monitoring a plurality of mechanical components.

Some of these objects are achieved by a mechanical component monitoring system constructed according to the invention. The system preferably comprises a plurality of mechanical components to be monitored, which may include various bearings, speed reducers and other such mechanical components.

Each of the mechanical components includes at least one sensor device in electrical communication with a respective local transmitter. A central monitoring processor is provided to selectively communicate with each of the local transmitters such that status information regarding the associated mechanical component will be supplied thereto at predetermined times.

Each of the local transmitters may have a unique electronic identifier associated therewith to facilitate communication with the central monitoring processor. In an exemplary construction, the central monitoring processor functions to sequentially interrogate the local transmitters via the respective electronic identifiers.

In presently preferred embodiments, a bus line interconnects the plurality of local transmitters and the central monitoring processor to provide electrical communication therebetween. Preferably, the bus line may include a main trunk and a plurality of branch lines, wherein the respective local transmitters are connected to the branch lines.

Other objects of the invention are achieved by bearing apparatus for facilitating rotation of a shaft. The bearing apparatus comprises a bearing housing having a bearing assembly contained therein. The bearing assembly includes respective annular members capable of relative rotation, with one of the annular members operatively rotating with the shaft.

The bearing apparatus further includes one or more sensor devices mounted proximate to the housing for detecting sensor information regarding the operation thereof. The sensor devices may include a shaft speed sensor, an accelerometer, a temperature sensor and other desirable sensors for monitoring bearing operation.

A local transmitter is also provided in electrical communication with the sensor devices. The local transmitter functions to provide status information, based on the sensor information, in a predetermined format at the output port thereof. Preferably, the local transmitter may supply the status information via a serial digital format.

In presently preferred embodiments, the local transmitter includes a printed circuit card having various components mounted thereon. The printed circuit card may be fixedly connected to the bearing housing, such as by being potted in a cover attached thereto. In this case, the accelerometer may be of the type incorporated into a microchip and directly mounted onto the printed circuit card.

Other objects of the invention are achieved by a method of monitoring a plurality of mechanical components. One step of the method involves providing a plurality of mechanical components, each of which includes at least one sensor device for detecting selected sensor information thereof. As an additional step, each of the mechanical components is provided with a respective local transmitter in electrical communication with the associated sensor devices.

A further step of the method involves sampling, with the local transmitter, the sensor information as detected by the sensor devices. Next, the local transmitter functions to produce selected status information from the sensor information. Each of the local transmitters is then electronically interrogated in a predetermined sequence to request the selected status information, which is then responsively supplied from the local transmitter.

In some embodiments, the local transmitter functions to convert the sensor information to a predetermined format, which may be supplied from the local transmitter as the status information. In other embodiments, the local transmitter may perform at least an initial analysis of the sensor information, whereby the status information represents a processing of the sensor information.

Other objects, features and aspects of the present invention are provided by various combinations and subcombinations of the disclosed elements, which are discussed in greater detail below.

BRIEF DESCRIPTION OF THE DRAWINGS

A full and enabling disclosure of the present invention, including the best mode thereof, to one of ordinary skill in the art is set forth more particularly in the remainder of the specification, including reference to the accompanying drawings, in which.

Figure 1:
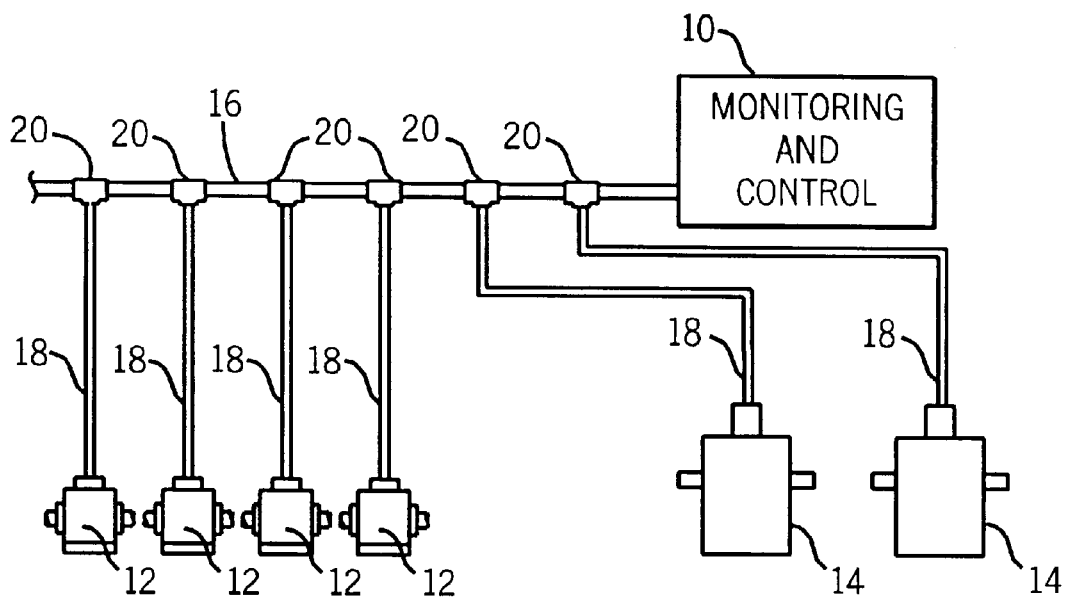
FIG. 1 is a diagrammatic representation of a mechanical component monitoring system constructed in accordance with the invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting broader aspects of the present invention, which broader aspects are embodied in the exemplary constructions.

An exemplary embodiment of a mechanical component monitoring system is diagrammatically illustrated in FIG. 1. As can be seen, the system includes a processor 10 which provides monitoring and control functions for an indeterminate number of mechanical components. For example, processor 10 may utilize information received from the respective mechanical components to provide diagnostic information. This diagnostic information can be obtained using such techniques as Fast Fourier Transform (FFT), trend line analysis or other suitable analysis techniques.

In this case, such mechanical components include a plurality of bearing assemblies 12 along with several speed reducers 14. Bearings 12 and speed reducers 14 each include a plurality of sensor devices in electrical communication with a respective local transmitter. The local transmitter provides status information regarding operation of the associated mechanical component to processor 10 in a predetermined format. In presently preferred embodiments, such information is transmitted to processor 10 as a serial digital word, in which portions of the word may be dedicated to information received from specific sensors.

Preferably, each of the local transmitters has a unique electronic identifier, or "address." As such, processor 10 may "interrogate" a particular local transmitter using this unique identifier. When interrogated in this manner, the local transmitter may responsively provide status information regarding the associated mechanical component. Preferably, processor 10 will interrogate the various local transmitters of the system according to a predetermined sequence.

In the illustrated embodiment, electrical communication between the local transmitters and processor 10 is accomplished utilizing a bus structure having a main trunk 16 and a plurality of branch lines 18. Branch lines 18 are respectively connected to the bearings 12 and speed reducers 14, as shown. Connection between branch lines 18 and main trunk 16 is facilitated by a plurality of T-couplings 20.

As discussed above, prior art arrangements often utilized a dedicated transmission line for each sensor associated with a particular mechanical component. As the number of mechanical components increased, the number of total lines also increased on a proportionate basis. In the illustrated embodiment, however, more mechanical devices can be added to the system by simply providing additional branch lines 18. Thus, the construction disclosed herein allows information to be provided to processor 10 in a manner which is more convenient and efficient.

It should be appreciated that the principals of the present invention are also applicable to arrangements which do not utilize a "hard-wired" bus. For example, the invention contemplates arrangements whereby the local transmitters provide status information to processor 10 via some form of telemetry, such as radio or infrared communication.

Figure 2:
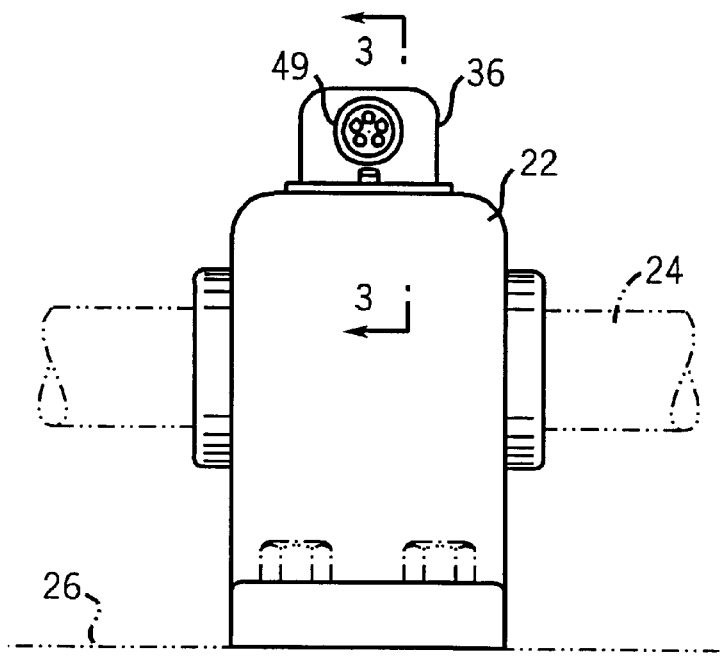
FIG. 2 is a side elevation of a bearing apparatus constructed in accordance with the present invention.
Figure 3:
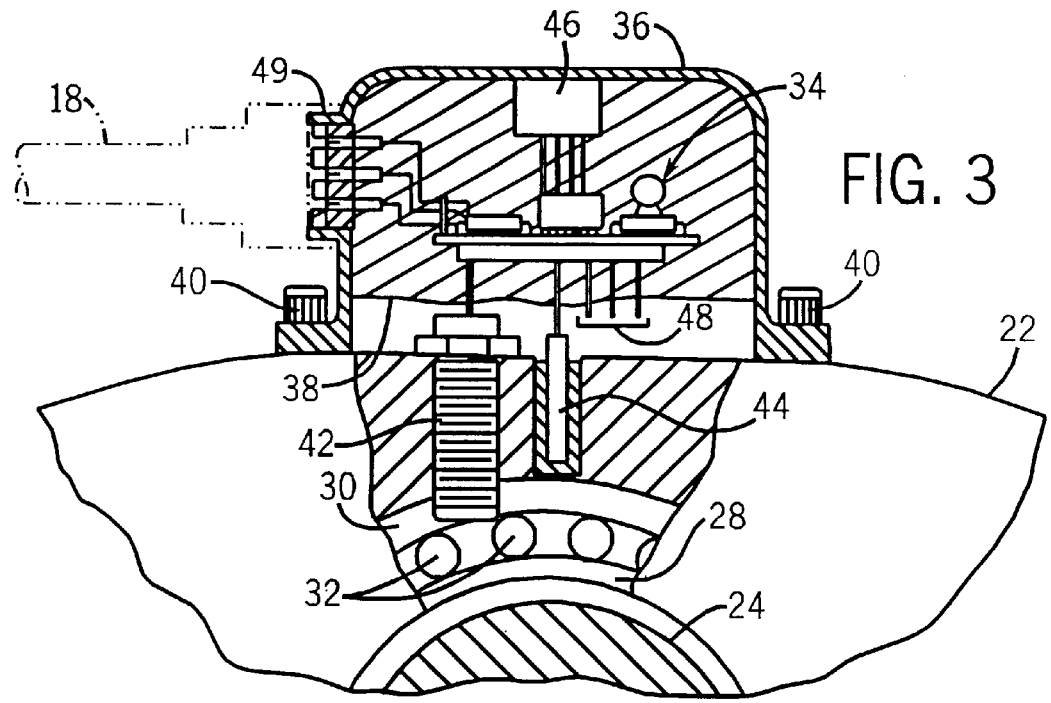
FIG. 3 is a partial cross sectional view as taken along lines 3—3 of FIG. 2.

FIGS. 2 and 3 illustrate the construction of a bearing apparatus such as bearings 12 of FIG. 1. As can be seen, the bearing apparatus includes a housing 22 having a bearing assembly therein for rotatably supporting a shaft 24. In this case, housing 22 is configured as a pillow block housing mounted to a stationary surface 26. It should be appreciated, however, that other suitable housing configurations, such as flange housings, may also be utilized.

Referring now particularly to FIG. 3, the bearing assembly located within housing 22 includes an annular inner ring 28 appropriately secured to shaft 12. Inner ring 28 defines an inner raceway about its outer circumferential surface. An annular outer ring 30 is further provided having an outer raceway situated in opposition to the inner raceway. A plurality of bearing elements, such as roller bearings 32, are disposed between the inner raceway and the outer raceway to facilitate relative rotation between ring members 28 and 30. While roller bearings are illustrated, it should be appreciated that other suitable types of bearing elements, such as ball bearings, may also be utilized for this purpose.

Depending on the exigencies of a particular situation, various techniques may be utilized to effect securement of inner ring member 28 to shaft 12. Among the arrangements which may be utilized for this purpose are various tapered adapter arrangements, set screw arrangements, eccentric collar clamping arrangements, and arrangements utilizing a slotted clamping collar situated about a plurality of clamping fingers.

The local transmitter may be constructed as a single printed circuit card 34 having various components mounted thereon. A cover 36, in this case a small housing, may be provided to protect card 34 during use. In some exemplary embodiments, card 34 is "potted" within cover 36 to provide an even greater degree of protection. In other words, card 34 may actually be embedded within an epoxy 38 or other suitable polymeric compound which fills the inner cavity of cover 36. Cover 36 may be attached to the exterior of housing 22 by bolts 40, or other suitable attachment means.

As can be seen in FIG. 3, the bearing apparatus in this case includes a speed sensor 42, a temperature sensor 44 and an accelerometer 46. Each of these sensors is preferably located within housing 22 or under cover 36 to provide a relatively compact arrangement, as shown. The sensors communicate with card 34 via respective signal lines extending therebetween. Depending on the requirements of a particular application, various other sensors may also be utilized, which communicate with card 34 via the respective signal lines collectively indicated at 48.

As shown, speed sensor 42 may be an inductive sensor operative to sense variations in its inductance produced during rotation of inner ring 28. In an exemplary construction, a nut or clamping collar used to secure inner ring 28 to shaft 24 may also function as a detection element from which sensor 42 can read.

As shown, temperature sensor 44 may be configured as a thermocouple sensor located within a receiving bore defined in housing 22. The construction of such a sensor is described in detail in U.S. Pat. No. 5,433,525, issued Jul. 18, 1995 to the present inventor, incorporated herein by reference.

In the illustrated embodiment, accelerometer 46 may be of a commercially available type constructed as a separate unit. This unit, like card 34, may be potted within cover 36 for protection. Accelerometer 46 contains a movable mass responsive to vibratory movement of housing 22 to produce an analogous output signal. As such, vibration of the bearing apparatus can be detected. One suitable accelerometer for this purpose is Model No. 327MII, marketed by IMI of Depew, N.Y.

As described above, circuitry located on card 34 receives sensor information and subsequently provides status information to the external processor. The status information may be transmitted in a serial digital format, in which portions of a digital word correspond to the respective sensors. In some embodiments, the status information may represent actual sensor information.

For example, consider a digital word sixty-four (64) bits in length. In this case, eight (8) bits may be respectively dedicated to information from each of speed sensor 42, temperature sensor 44 and accelerometer 46. The remainder of the word will be used for identification and communication protocol and checking of the transmission.

In other embodiments, the local transmitter may perform at least an initial analysis of the sensor information. In this case, the status information would represent a processed version of the sensor information. As an example, the local processor may perform an FFT on the sensor information to provide some form of diagnostic data to the central processor. Other suitable analysis techniques, such as trend line analysis, may also be utilized for this purpose.

Card 34 provides the digital word containing the status information to a local port 49. As shown, branch line 18 is connected to port 49, thus establishing electrical communication with processor 10. In the illustrated embodiment, port 49 is a five (5) pin port, corresponding to the five (5) lines comprising the overall bus. Preferably, port 49 is configured such that branch line 18 may be easily connected or disconnected as desired.

Figure 4:
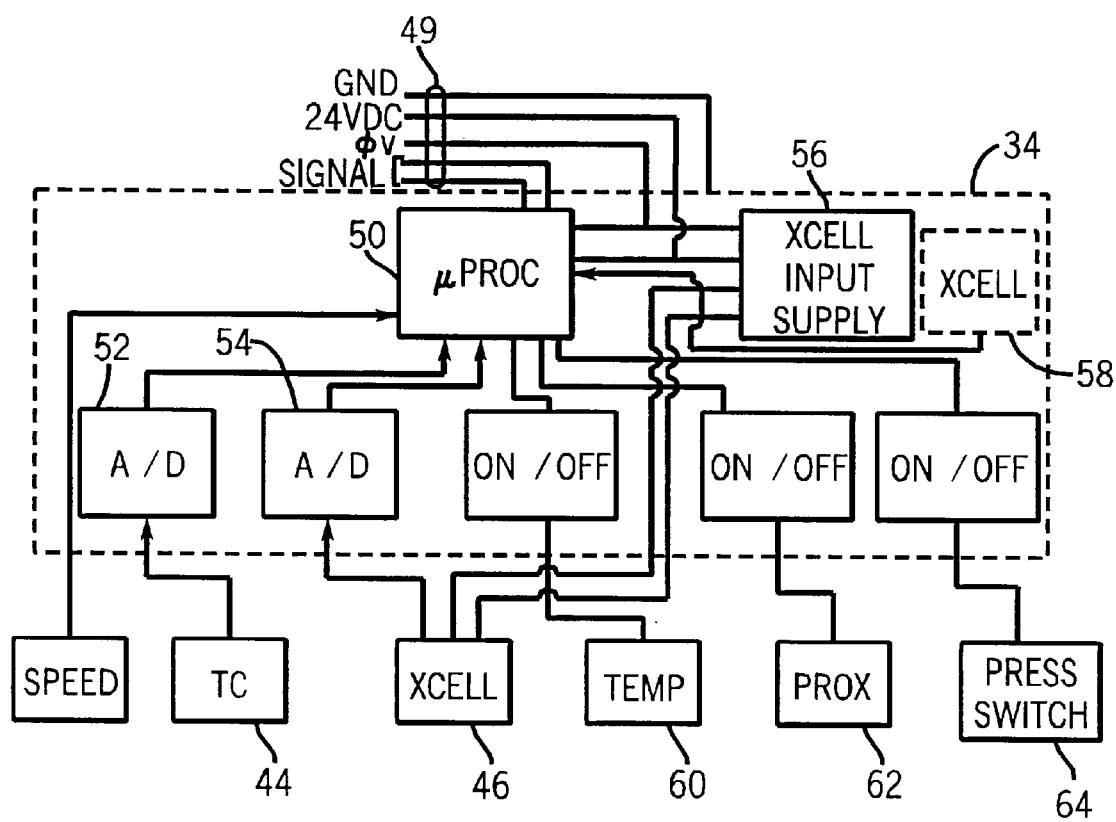
FIG. 4 is a diagrammatic representation illustrating a local transmitter of the present invention as connected to a variety of sensor devices.

As can be seen in FIG. 4, two of the five (5) lines in the bus serve to transmit signal information between card 34 and processor 10. Presently preferred embodiments utilize the controller area network (CAN) protocol for this purpose because it generally allows longer distance transmission than some other protocols, such as RS-232. Two other lines provide operating voltage for the circuit components, e.g, floating +24 VDC in the illustrated embodiment. The fifth line provides case grounding (GND).

Card 34 includes an on-board microprocessor 50 to recognize the external interrogation and provide the desired serial output. The output of some sensors, such as speed sensor 42, may be provided directly to microprocessor 50. For other sensors, it may be appropriate to provide a separate analog-to-digital (A/D) converter. For example, the outputs of temperature sensor 44 and accelerometer 46 are in this case provided to respective A/D converters 52 and 54. Converters 52 and 54, in turn, supply a representative digital output to microprocessor 50. It should be appreciated, however, that some suitable microprocessors may have one or more internal A/D converters.

Typical accelerometer devices, such as accelerometer 46, often utilize an external power supply circuit. In accordance with the present invention, this supply circuit may be mounted directly on card 34, as indicated at 56. In addition, the accelerometer itself may be mounted on card 34 in some alternative embodiments. Specifically, accelerometers have recently been developed which are incorporated into a microchip. Such a "micromachine" accelerometer is diagrammatically indicated at 58.

Other sensors which may be connected to microprocessor 50 provide an on/off output. In other words, the devices are configured to change state (from either a normally open or a normally closed state) when the parameter of interest exceeds a predetermined threshold. Examples of such sensors include temperature switch 60 and proximity switch 62. A preferred arrangement of temperature switch 60 is shown in U.S. Pat. No. 5,439,296, issued Aug. 8, 1995 to the present inventor and incorporated herein by reference.

Another sensor which provides an on/off signal is pressure switch 64. Generally, pressure switch 64 would not be utilized with a bearing, but may be incorporated into a speed reducer. Pressure switch 64 will function to detect when the pressure inside the reducer exceeds a predetermined value, which signals that the breather is plugged.

While preferred embodiments of the invention have been shown and described, it will be appreciated that modifications and variations may be made thereto by those of ordinary skill in the art without departing from the spirit and scope of the present invention. For example, the term "mechanical components" as used herein can include a variety of mechanical and electromechanical devices, including motors. It will be further appreciated that aspects of the various embodiments may be interchanged both in whole or in part. Additionally, those of ordinary skill in the art will appreciate that the foregoing description is by way of example only, and is not intended to be limitative of the invention so further described in such appended claims.

What is claimed is:

1. A system for monitoring a plurality of bearing units in operation in a single facility, said system comprising:

a plurality of bearing units to be monitored, each bearing unit thereof including a housing supporting a plurality of bearing elements and multiple sensor devices each for detecting a respective different type of selected sensor information, at least one of said sensor devices being received within a bore formed in the housing, the sensor devices including at least two different sensors selected from a group including a shaft speed sensor, an accelerometer and a temperature sensor;

a plurality of local transmitters respectively associated with said plurality of bearing units, a respective local transmitter thereof being in electrical communication with said sensor devices of an associated bearing unit to receive said selected sensor information, said local transmitter including a local port having a predetermined connector configuration;

a central monitoring processor in selective electrical communication with each said respective local transmitter such that selected status information regarding said associated bearing unit will be supplied to said central monitoring processor at predetermined times; and a bus line interconnecting said plurality of transmitters and said central monitoring processor to provide electrical communication of power and data signals therebetween, said bus line including a main trunk and a plurality of branch lines extending from said main trunk, a respective branch line being connected to one of said local transmitters by connection to said local port thereof.

2. A mechanical component monitoring system as in claim 1, wherein each said respective local transmitter has a unique electronic identifier associated therewith to facilitate communication with said central monitoring processor.

3. A mechanical component monitoring system as in claim 2, wherein each said respective local transmitter functions to supply said selected status information to said central monitoring processor via a serial digital format.

4. A mechanical component monitoring system as in claim 1, wherein each of said respective local transmitters functions to send said selected status information to said central monitoring processor according to a predetermined serial protocol.

5. A mechanical component monitoring system as in claim 1, wherein said plurality of sensor devices includes at least three sensor devices, including a shaft speed sensor, an accelerometer and a temperature sensor.

6. A mechanical component monitoring system as in claim 2, wherein said central monitoring processor functions to sequentially interrogate said respective local transmitters via said unique electronic identifier.

7. A mechanical component monitoring system as in claim 1, wherein said plurality of mechanical components includes at least one speed reducer apparatus.

8. A bearing apparatus for facilitating rotation of shaft, said bearing apparatus comprising:
   a bearing housing;
   a bearing assembly contained in said housing and including respective annular members capable of relative rotation, one of said annular members operatively rotating with said shaft;
   multiple sensor devices mounted proximate said housing, each of said multiple sensor devices for detecting a respective different type of sensor information regarding said bearing apparatus, at least one of said sensor device received within a bore formed in the housing, the sensor devices including at least two different sensors selected from a group including a shaft speed sensor, an accelerometer, and a temperature sensor; and
   a local transmitter including an output port having one connector portion adapted to connect with another portion of a hard-wired transmission bus for transmitting power and data signals, said bus including a trunk line and branch lines for said local transmitter, said local transmitter being in electrical communication with said multiple sensor devices to receive said sensor information therefrom and subsequently providing selected status information at said output port in a predetermined format.

9. A bearing apparatus as set forth in claim 8, wherein said local transmitter has a unique electronic identifier associated therewith to facilitate communication with an external processor.

10. A bearing apparatus as in claim 9, wherein said local transmitter functions to supply said status information from said output port via a serial digital format.

11. A bearing apparatus as in claim 10, wherein said status information includes said sensor information as embedded within a serial digital word.

12. A bearing apparatus as in claim 10, wherein predetermined portions of said serial digital word represent information received from respective of said plurality of sensor devices.

13. A bearing apparatus as in claim 10, wherein said local transmitter functions to analyze said sensor information and provide processed data within said status information.

14. A bearing apparatus as in claim 8, wherein said multiple sensor devices include a shaft speed sensor, an accelerometer and a temperature sensor.

15. A bearing apparatus as in claim 8, wherein said local transmitter includes a printed circuit card having various components mounted thereon, said printed circuit card being fixedly connected to said bearing housing.

16. A bearing apparatus as in claim 15, wherein said printed circuit card is potted in a cover attached to said bearing housing.

17. A bearing apparatus as in claim 15, wherein said plurality of sensor devices includes an accelerometer mounted on said printed circuit card.

18. A bearing apparatus as in claim 17, wherein said accelerometer is of the type incorporated into a microchip.

19. A method of monitoring a plurality of bearing units in operation in a single facility, said method comprising the steps of:

(a) providing a plurality of said bearing units to be monitored, each said bearing unit thereof including multiple sensor devices each operative to detect a different type of selected status information, at least one of said sensor devices being received within a bore formed in the housing, the sensor devices including at least two different sensors selected from a group including a shaft speed sensor, an accelerometer, and a temperature sensor;

(b) providing for each said bearing unit a respective local transmitter in electrical communication with said multiple sensor devices;

(c) sampling, with said local transmitter, selected sensor information as detected by said multiple sensor devices;

(d) producing, with said local transmitter, selected status information based on said selected sensor information;

(e) electronically interrogating each local transmitter via a hard-wired bus structure to request said selected information, said bus structure including a trunk line and branch lines for said local transmitters, the bus structure providing power and data signals for the local transmitters; and (f) responsively supplying said selected status information from said local transmitter via said hard-wired bus structure.

20. A method as set forth in claim 19, wherein step (d) comprises at least in part converting, with said local transmitter, said selected sensor information to a predetermined format to produce said selected status information.

21. A method as set forth in claim 19, wherein step (d) comprises analyzing said selected sensor information to produce said selected status information.

22. A method as set forth in claim 19, wherein said selected status information is supplied from said local transmitter in a serial digital format.

23. A method as set forth in claim 19, wherein said multiple sensor devices include a shaft speed sensor, an accelerometer and a temperature sensor.

24. A method as set forth in claim 19, wherein said local transmitter is electronically interrogated in step (e) utilizing a unique electronic identifier preassigned thereto.

* * * * *